M. A. MARQUETTE.
TUBE SPLICING.
APPLICATION FILED NOV. 9, 1920.
1,385,220.
Patented July 19, 1921.
2 SHEETS—SHEET 1.
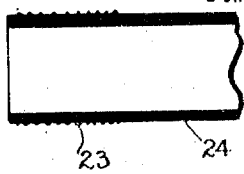
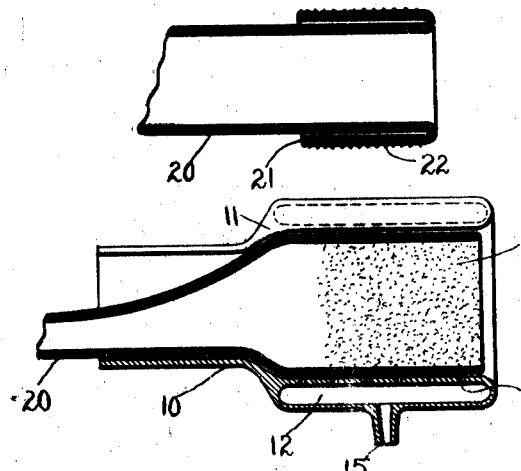
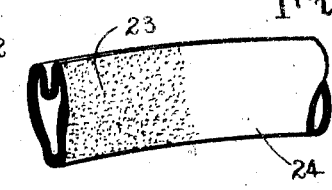
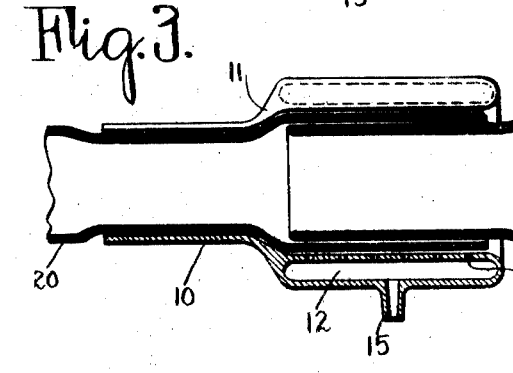
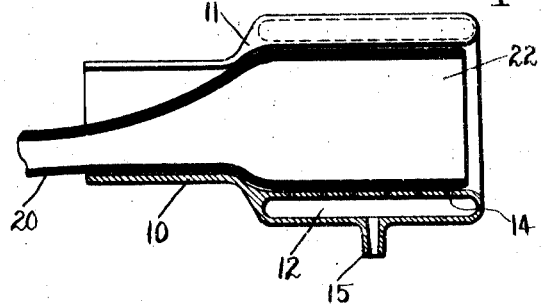
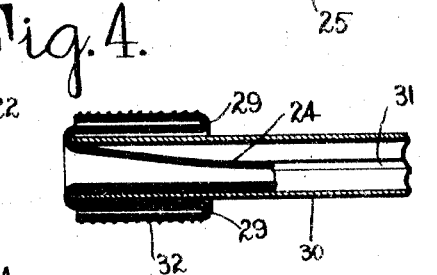
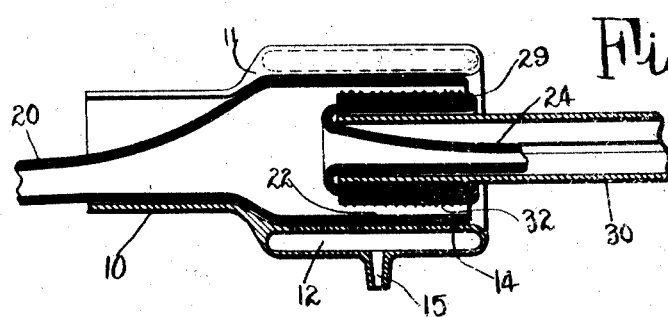
INVENTOR
Melvon A. Marquette.
BY
Edward C. Taylor
ATTORNEY M. A. MARQUETTE.
TUBE SPLICING.
APPLICATION FILED NOV. 9, 1920.
1,385,220.
Patented July 19, 1921.
2 SHEETS—SHEET 2.
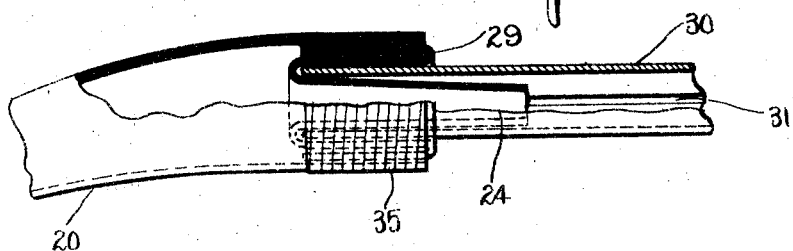
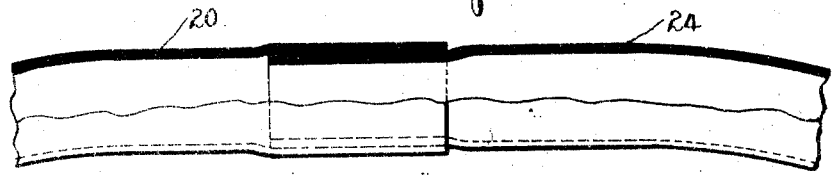
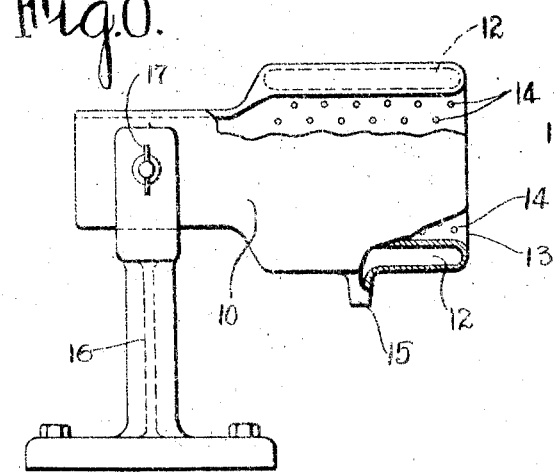
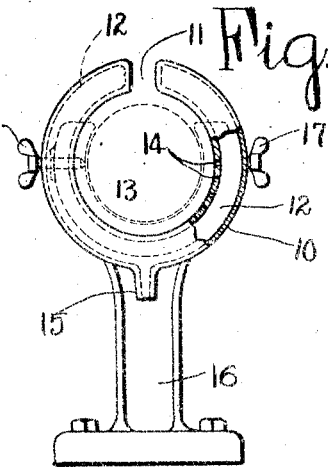
INVENTOR
Melvon A. Marquette
BY
Edward C. Taylor
ATTORNEY

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TUBE-SPLICING.

1,385,220.

Specification of Letters Patent.  Patented July 19, 1921.

Application filed November 9, 1920.  Serial No. 422,785.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Tube-Splicing, of which the following is a specification.

My invention relates to the splicing of rubber tubes, particularly the inner tubes used in automobile tire casings.

In the manufacture of inner tubes a straight tube is first formed which then has its ends joined to form the annular tube used in tires. My invention relates to improvements in methods and apparatus for performing this splicing operation, and has for its operation the facilitation of the operation itself and the improvement of the splice obtained thereby.

My invention will now be described with particular reference to the accompanying drawings, in which, Figure 1 is a fragmentary view of one manner of cementing two tube sections to be joined;

Figs. 2 and 3 show subsequent steps in the splicing operation;

Figs. 4, 5, and 6 show steps in a different method of splicing;

Fig. 7 is a view of a completed tube;

Fig. 8 is an elevation, partly broken away, of the external mandrel used; and

Fig. 9 is an end view of the mandrel shown in Fig. 8.

The splicing operation to which my invention relates may be carried out either by the hot or cold method of vulcanization, my invention being directed more particularly to the method of joining the ends of a tube prior to the actual vulcanization. For convenience, however, I will describe the process as applied to the preparation of the splice for cold vulcanization.

In joining the ends of a tube I make use of an external mandrel such as is shown in Figs. 8 and 9. As this mandrel will be referred to through the description of the process itself, I will describe it before turning to its application in the splicing operation. This mandrel comprises a hollow approximately cylindrical portion 10 having a longitudinal opening 11 to permit of ready removal of a spliced tube. An annular chamber 12 encircles one end of the mandrel and connects with the hollow interior 13 of the mandrel by a plurality of small holes 14. A connection 15 is provided whereby the chamber 12 may be connected to a suitable means of producing a partial vacuum. The mandrel may be supported in any suitable way, as by a standard 16 to which the mandrel is held by wing nuts 17.

Returning to the splicing process as applied to a cold or acid cure, a suitable vulcanizing cement is applied in any suitable way, as by folding one tube end 20 back on itself as at 21, and by then applying with a brush a coat of cement 22 to the folded back portion, and a coat 23 to the outside of the other tube end 24. After the cement is dry the end 20 is turned straight again so that the cemented surface comes on the inside. This end is then inserted into the external mandrel previously described, chamber 12 being at this time connected to a partial vacuum. The end of the tube is pressed by the hand of the operator or any suitable means into contact with the interior of the mandrel, the suction applied through holes 14 serving to hold it distended. The cemented portion 23 of tube end 24 is now coated with a suitable vulcanizing "acid," unless such acid was incorporated in the cement as originally applied, and this end, preferably slightly folded as shown in Fig. 2, is inserted within the distended end 20. By now introducing air pressure within the tube by a suitable connection 25 the tube is caused to expand, bringing the two telescoped ends into firm contact as shown in Fig. 3. The joint is now left in this condition for a time sufficient for vulcanization to take place. The tube is then deflated and removed from the external mandrel through opening 11.

Another method of splicing a tube is shown in Figs. 4, 5, and 6. End 20 is prepared and located within the external mandrel in the same manner as before. End 24, however, is reversely folded as shown at 29 in Fig. 4 upon a split mandrel 30 having an opening 31 whereby the tube may be removed after vulcanization, and a coat 32 of cement applied to the outer surface. The tube end 24 so prepared and mounted is inserted within the distended end 20, and the vacuum in chamber 12 broken, allowing the end 20 to contract upon end 24, as shown in Fig. 6. The joint is now pressed tightly against the mandrel 30 by a wrapping of elastic tape 35 or other suitable means, and the splice allowed time to cure. The wrapping is then removed, and the tube straightened out and removed from mandrel 30 through slot 31.

It will be understood that various changes in the procedure may be made without departing from the principle of my invention as set forth in the appended claims. In particular, the manner of vulcanization may be varied, my invention relating to the physical manner of placing the tube ends in proper lapped relation rather than to the chemical method of vulcanization.

Having thus described my invention, I claim:

1. The method of splicing tubes comprising coating the inner surface of one section of tube and the outer surface of another section of tube with cement, holding that section having its inner surface coated distended without interfering with access to its inner surface, locating the second section within the first section, and bringing the cemented surfaces into contact.

2. The method of joining tubes comprising holding one section of tube distended by means applied to its outer surface, locating a second section of tube within the distended portion of the first, and bringing the adjacent surfaces of the two sections into contact.

3. The method of joining tubes comprising holding one section of tube distended by suction applied to its outer surface, locating a second section of tube within the distended portion of the first, and bringing the adjacent surfaces of the two sections into contact.

4. The method of joining the ends of an annular tube comprising holding one end of the tube distended by suction applied to its outer surface, locating the other end of the tube within the first end, and inflating the tube to bring the adjacent surfaces of the two sections into contact.

5. The method of joining tubes comprising folding one section of tube upon a mandrel, holding a second section of tube distended by suction applied to its outer surface, locating the mandrel with the first section thereon within the distended portion of the second, and releasing the distended portion of the second section so that it may contract upon the first section.

6. The method of joining the ends of an annular tube for vulcanization comprising coating the outer surface of one end of the tube and the inner surface of the second end of the tube with self-vulcanizable cement, reversely folding the first end upon a split mandrel so that the cemented surface is outermost, holding the second end distended by suction applied to its outer surface, locating the mandrel carrying the first end within the distended second end, allowing the second end to contract upon the cemented portion of the end carried by the mandrel, pressing it yieldingly thereagainst for a time necessary for vulcanization, and removing the split mandrel.

7. A device of the character described comprising a shell having a longitudinal opening therein to permit of the withdrawal of an annular tube therefrom, said shell having a plurality of perforations in a portion of its inner surface, a chamber in said shell connected to said perforations, and means whereby said chamber may be connected to a source of suction.

MELVON A. MARQUETTE.